United States Patent
Colak et al.

(10) Patent No.: US 6,752,381 B2
(45) Date of Patent: Jun. 22, 2004

(54) WHEEL POSITIONAL RESTRAINT DEVICE AND METHOD FOR USING THE SAME

(75) Inventors: John I. Colak, Calgary (CA); L. Reg Funk, Calgary (CA)

(73) Assignee: Tri-Lynx Corporation, Irving, TX (US)

( * ) Notice: Subject to any disclaimer, the term of this patent is extended or adjusted under 35 U.S.C. 154(b) by 0 days.

(21) Appl. No.: 10/068,387

(22) Filed: Feb. 6, 2002

(65) Prior Publication Data

US 2003/0146422 A1 Aug. 7, 2003

(51) Int. Cl.⁷ .................................................. E02C 3/00
(52) U.S. Cl. ...................................................... 254/88
(58) Field of Search ...................... 254/88; 152/213 R; 269/296, 16; 7/118, 158; 14/69.5, 71.1; 188/32; 248/352; 446/124–128

(56) References Cited

U.S. PATENT DOCUMENTS

| | | | |
|---|---|---|---|
| 3,162,973 A | 12/1964 | Christiansen | |
| 3,487,579 A | 1/1970 | Brettingen | |
| 3,752,441 A | 8/1973 | Rogers | |
| 4,026,086 A | 5/1977 | Langley | |
| 4,050,403 A | * 9/1977 | Miller | 116/124 R |
| 4,108,421 A | * 8/1978 | Extine | 254/88 |
| 4,165,862 A | 8/1979 | Bennett | |
| 4,427,179 A | 1/1984 | Price | |
| 4,548,392 A | 10/1985 | Rickling | |
| 4,606,732 A | 8/1986 | Lyman | |
| 4,744,780 A | 5/1988 | Volpe | |
| 4,819,910 A | 4/1989 | Johnston | |
| 4,836,501 A | 6/1989 | Baer | |
| 5,328,154 A | 7/1994 | Blatz et al. | |
| 5,458,315 A | 10/1995 | Blatz et al. | |
| 5,483,715 A | * 1/1996 | Fogarty | 14/69.5 |
| D426,933 S | 6/2000 | Redfern | |
| 6,439,543 B1 | * 8/2002 | Peckham | 254/88 |

FOREIGN PATENT DOCUMENTS

| | | |
|---|---|---|
| AU | 242955 | 2/1960 |
| CH | 326589 | 7/1961 |
| CH | 355070 | 7/1961 |
| CZ | 80935 | 8/1951 |
| DE | 1070420 | 12/1959 |
| GB | 1194445 | 6/1970 |
| IT | 374571 | 9/1939 |
| IT | 374571 | 1/1990 |

* cited by examiner

Primary Examiner—Joseph J. Hail, III
Assistant Examiner—Daniel Shanley
(74) Attorney, Agent, or Firm—Dykema Gossett PLLC

(57) ABSTRACT

A multi-tiered assembly of leveler units with a vehicle wheel positional restraint is provided. The leveler units each comprise a planar body, with upper and lower surfaces circumscribed by edges. The body of each unit bears a plurality of pins upwardly extending from the upper surface and has a plurality of pockets formed in the lower surface to receive corresponding pins of other similar units. The pins are of slightly smaller size than the corresponding pockets. The positional restraint can interlock with the other leveler units and additionally provide an upper surface with an obstruction to prevent wheel movement.

53 Claims, 10 Drawing Sheets

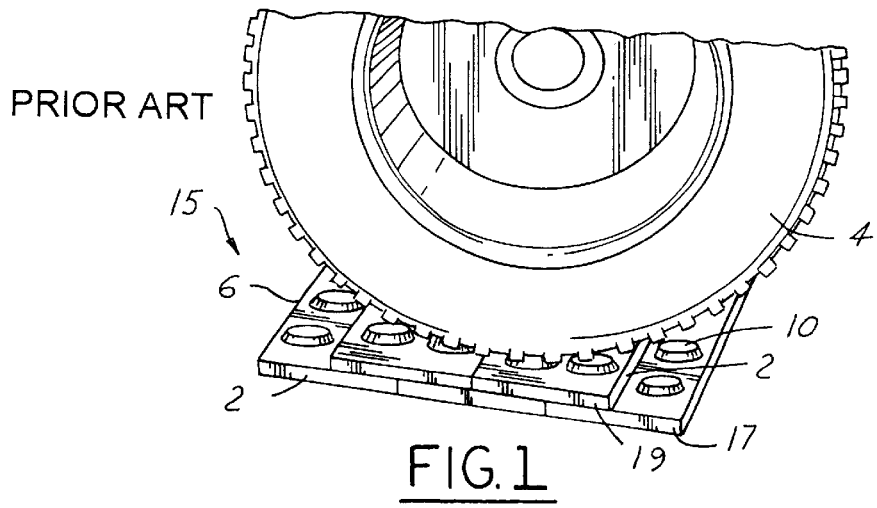
FIG. 1 PRIOR ART
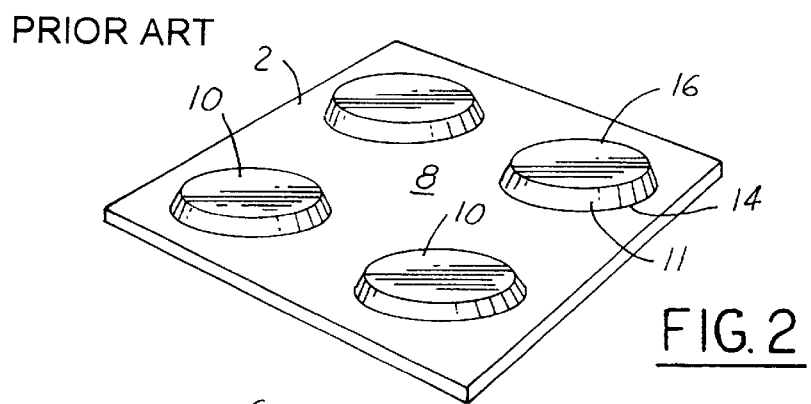
FIG. 2 PRIOR ART
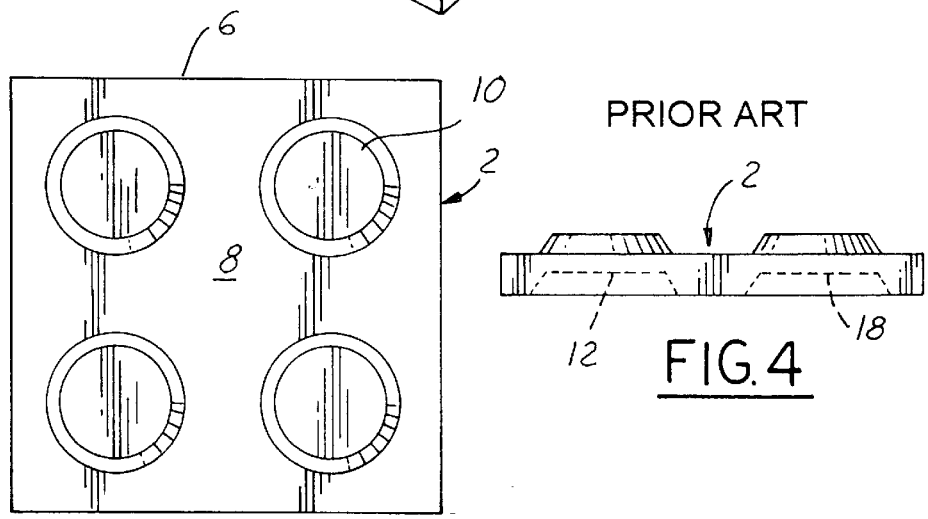
FIG. 3 PRIOR ART
FIG. 4 PRIOR ART

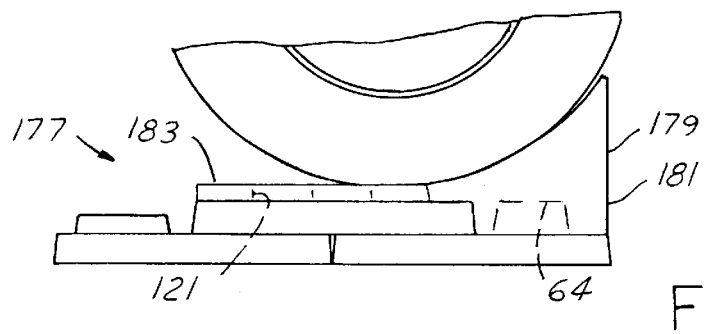
FIG.18
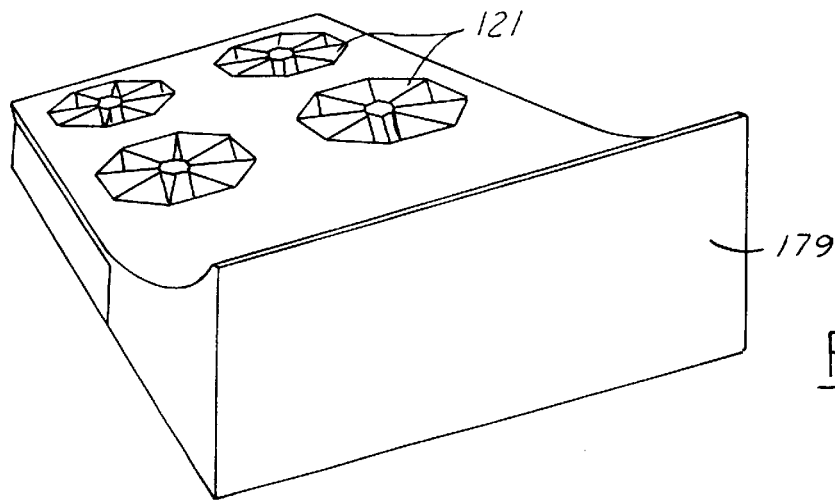
FIG.19
FIG.20
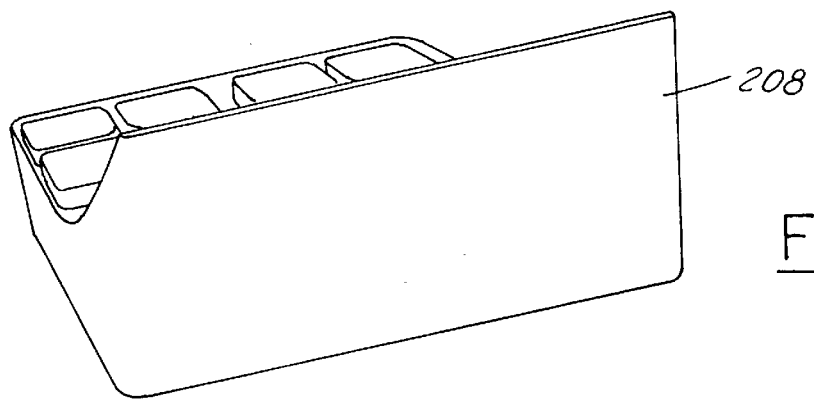
FIG.21

WHEEL POSITIONAL RESTRAINT DEVICE AND METHOD FOR USING THE SAME

FIELD OF THE INVENTION

The invention relates to leveling devices for vehicles, especially large, recreational vehicles and trailers.

BACKGROUND OF THE INVENTION

Recreational vehicles must be maintained in a level, horizontal position when parked in order to ensure comfort and proper operation of appliances, tables, and the like. Examples of ramp leveling devices can be found by a review of Blatz, et al., U.S. Pat. No. 5,328,154, commonly assigned; Blatz, et al., U.S. Pat. No. 5,458,315, commonly assigned; and Redfern, U.S. Pat. Des. No. 426,933. The disclosures of U.S. Pat. Nos. 5,328,154 and 5,458,315 are incorporated by reference herein.

It is not only desirable for a leveler assembly to lift and support a wheel of a recreational vehicle but it is often additionally desirable to restrain movement of a wheel of a recreational vehicle in a first given direction. A vehicle wheel positional restraint is advantageous for two separate reasons. First, a vehicle wheel positional restraint will give feedback to a vehicle operator that the wheel has reached a position upon the leveler assembly that the person desires. Second, the wheel positional restraint restrains movement of the vehicle wheel after the vehicle has been parked. Examples of patents which illustrate leveler assembly devices with wheel restraints can be found in Price, U.S. Pat. No. 4,427,179 and Rogers, U.S. Pat. No. 3,752,441.

It is desirable to provide an apparatus and method of utilization thereof of a vehicle wheel positional restraint which can be utilized with ramp leveler devices similar to those found in Blatz, et al., U.S. Pat. No. 5,328,154, Blatz, et al., U.S. Pat. No. 5,458,315, and Redfern, U.S. Pat. Des. No. 426,933.

SUMMARY OF THE INVENTION

In a preferred embodiment the present invention brings forth a vehicle wheel positional restraint useful in a wheel support leveler assembly. The assembly includes a first planar body having upper and lower surfaces with pins extending from spaced locations similar to those mentioned in the Blatz, et al. patents. The vehicle wheel positional restraint in a preferred embodiment includes a body having a lower surface with pin engaging pockets to receive pins of planar bodies in a non-interfering interlocking manner. The vehicle wheel positional restraint has an upper surface with an obstruction at an extreme end to prevent movement of the vehicle in a first given direction. The vehicle wheel positional restraint also in such preferred embodiment has a portion for overlapping one planar body with pockets for engaging pins of such planar body. The vehicle wheel positional restraint additionally will have a heel portion having pin engaging pockets for engaging a second planar body laterally positioned with respect to the first planar body. The second planar body is stacked at a different vertical height.

The combined assembly of the planar bodies and the vehicle wheel positional restraint cooperate to lift, support and additionally restrain the position of the vehicle wheel in a first given direction.

The above-noted features and advantages of the present invention will be further realized by those skilled in the art from a review of the invention as provided in the accompanying drawings and detailed description.

BRIEF DESCRIPTION OF THE DRAWINGS

FIG. 1 is a perspective view of a plurality of leveler units to lift and support, and level a vehicle.

FIG. 2 is a perspective view of one unit of FIG. 1.

FIG. 3 is a top plan view of the unit of FIG. 2.

FIG. 4 is a side elevation view of the unit of FIG. 2.

FIG. 18 is a side elevational view of an alternate preferred embodiment wheel support leveler assembly according to the present invention.

FIG. 19 is a rear perspective view of the wheel support leveler assembly shown in FIG. 18.

FIG. 20 is a side elevational view of an alternate preferred embodiment wheel support leveler assembly according to the present invention.

FIG. 21 is a rear perspective view of the positional restraint utilized in FIG. 20.

DETAILED DESCRIPTION OF THE INVENTION

Figure 5:
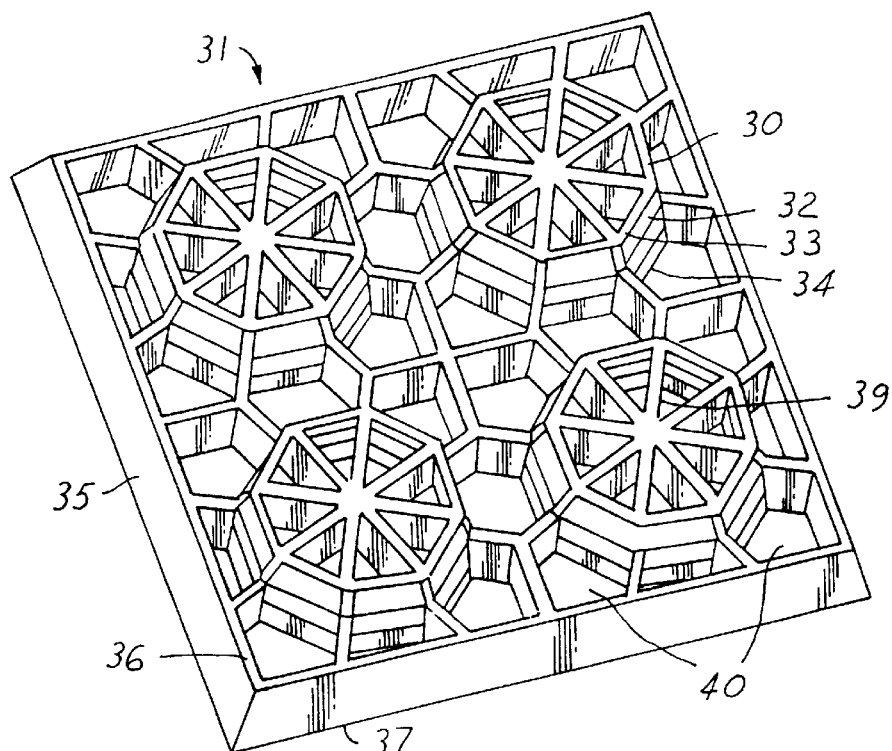
FIG. 5 is a perspective view of an alternative embodiment of leveler unit.

FIG. 1 illustrates a plurality of units 2 supporting a wheel 4 of a recreational vehicle or the like, for leveling purposes. As shown in more detail in FIGS. 2–4, the units 2 have a planar body preferably substantially square in shape circumscribed by edges 6. Extending upwardly from equally spaced locations in the upper surface 8 of the generally planar unit 2 is a plurality of pins 10. The pins 10 have a circumferential surface 11. It should be noted that, as used herein, circumferential refers to any outer perimeter and is not limited to conical or circular shapes. These pins 10 are of equal shape and size, and are aligned in rows parallel to the edges 6 of the unit. The equal spacing of the pins 10 promotes their ability to matably receive and interlock with appropriately located pin engaging pockets 12 in a bottom surface of other similar units 2. Each pin 10 is located with respect to its adjacent pins 10 a distance twice the distance between that pin 10 and its adjacent edges.

In the embodiment shown in FIGS. 2–4, the pins 10 are of truncated conical shape, and are slightly smaller than the pockets 12. The pockets 12 are contoured similarly to the pins. In this configuration, a loose engagement is maintained between the pins 10 and the corresponding pockets 12 of other units so that slight relative movement is permitted of the pins 10 while remaining within the respective pockets 12.

In the embodiment shown in FIGS. 1–4 the pins 10 possess bases 14 of a slightly larger transverse cross sectional area than their tops 16. The sides of the pins slope marginally outwardly from their tops 16 towards their bases 14.

The lower surfaces 18 of each unit 2 (FIG. 4) comprise a plurality of pockets 12 which extend into the said lower surface 18. The pockets 12 are of similar shape and size and are also equally-spaced throughout the lower surface of the planar body of the unit so as to be located directly beneath corresponding pins 10. The pockets 12 are slightly larger than the pins 10 so that when engaged, the pins 10 (and their respective unit) are capable of limited lateral relative movement with respect to another unit's pockets 12. The aforementioned limited lateral movement is intended to facilitate self-stabilization and adjustment of the units 2 when a plurality of the units 2 is combined for operation. Since a clearance is provided about the entire portion of the circumferential surface 11 of the pin 10, an interference fit between the pin 10 and a corresponding pocket 12 is prevented. The clearance also facilitates disassembly of the units 2 after usage.

The plurality of units 2 is capable of association by means of an engagement between the pins 10 of one unit 2 and the pockets or recesses 12 of another unit 2. This pin/pocket association permits the individual units to be utilized in combination, thus forming a leveling assembly device of a variety of widths and heights.

Figure 6:
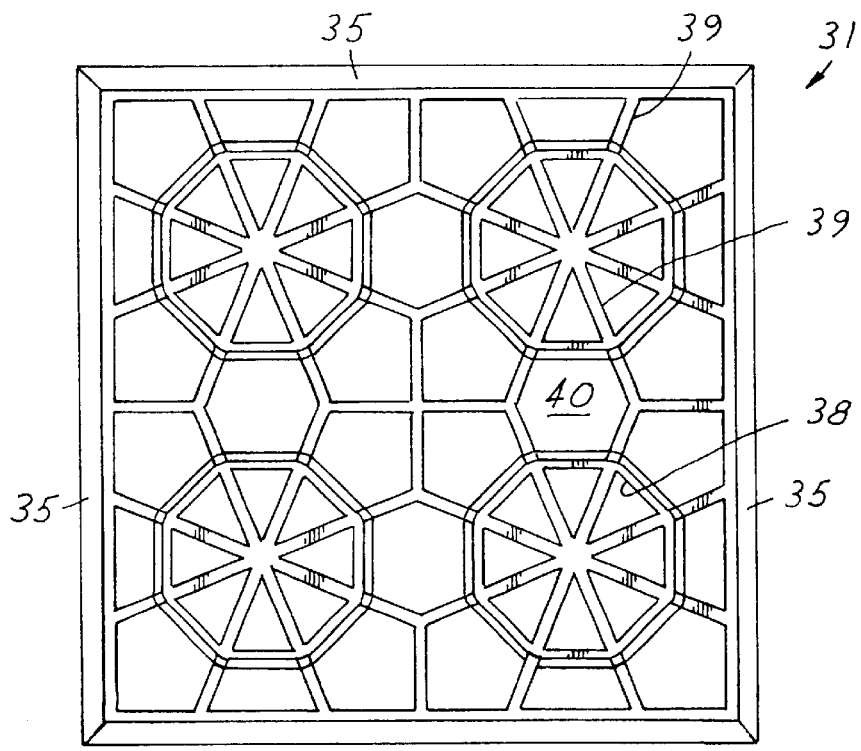
FIG. 6 is a top plan view of the unit of FIG. 5.

In an alternative embodiment illustrated in FIGS. 5 and 6, the pins 30 of the units 31 are of a polygonal shape of an octahedral in transverse cross-section, again preferably having sides 32 which are outwardly sloped from top 33 to bottom 34. The units 31 are similarly square in shape, and are bound at their perimeters by inwardly sloping edges 35, these edges tapering from bottom 37 to top 37. In this embodiment, the pockets 38 are of corresponding shape, and slightly larger than the pins 30 so that a loose engagement is maintained when the pins 30 of one unit 31 are received by the corresponding recesses or pockets 38 of an upper unit 31. In this embodiment while the body of the units 31 is similarly generally planar, it is composed not of continuous material but rather of a discontinuous webbing 39 containing a plurality of apertures 40 which extend between the upper and lower surface of the body of the unit 31.

As shown in FIG. 1, units 2/31, alone or in combination with other such units 2/31, provides a means for leveling and supporting recreational and other vehicles by providing a surface at a variety of potential heights upon which the wheels 4 of the vehicle can be mounted and rest. The pins 10/30 extend from the upper surface 8/36 into a corresponding pocket 12/38 providing stability to the wheels 4 when mounting. The pin 10/30, pocket 12/38 interface and maintain the position of the leveler units 2/31 against lateral or longitudinal displacement (beyond a small limited amount).

The number of units 2/31 required is dictated by the number of vehicle wheels 4 requiring support and the height required to be provided for each of said wheels. In most applications it is preferable to have the units 2/31 form a base or lower level 17 with units 2/31 positioned adjacent to one another with the pins 10/30 extending upwardly (FIG. 1). An upper level 19 is then formed by placing one or more units 2/31 onto the lower level 17 by engaging pins 10/31 at an "offset" so that the pockets 12/38 of an upper level unit 2/31 receive the pins 10/30 of two units 2/31 from the lower level 17. This process can be repeated, thus forming a leveler assembly 15 at a desired height. When formed, the leveler assembly 15 provides dual step-type ramped edges permitting the vehicle's wheels to mount from and descend from, either side of the leveler assembly 15.

Further facilitating the wheel's 4 ability to mount onto the leveler assembly 15 is the sloped shape of the units 2/31 perimeter edges 6/35. These perimeters, having slightly wider bases than upper surfaces, provide a small, preliminary ramp onto which the vehicle's wheels may mount.

The leveler units 2/31, when formed to the desired height for lifting and/or leveling a vehicle, are to be placed in front of or behind any number of the vehicle's wheels 4. The vehicle is then driven slowly up onto the assembly 15 so that the vehicle's wheels 4 are mounted thereon. During the mounting of the wheels 4, the shape of the perimeter edges 6 and the loose engagement of the pins 10/30 and pockets 12/38 allow the leveler assembly 15 to adjust to the tremendous weights, while preventing the stacked units 2/31 from tipping during initial contact of the wheels 4 with the leveler assembly 15. During mounting, the pin 10/30, pocket 12/38 engagement allows for slight relative movement therebetween allowing the leveler assembly 15 to adjust itself while preventing the units 2/31 of corresponding different levels 17, 19 becoming inseparably bound to each other. Further, the pins 10/30 extend upwardly from the upper surfaces 8 and are exposed to the wheels 4 of the vehicle during mounting, thus providing a surface that reduces the possibility of slipping between the upper surface 8/36 and the wheels 4.

When dismounting the leveler assembly 15, the process is essentially similar but operated in reverse, with the vehicle being able to dismount by travelling in the opposite direction. The loose pin/pocket 10/30, 12/38 engagement allows the units 2/31 to be easily separated.

Figure 7:
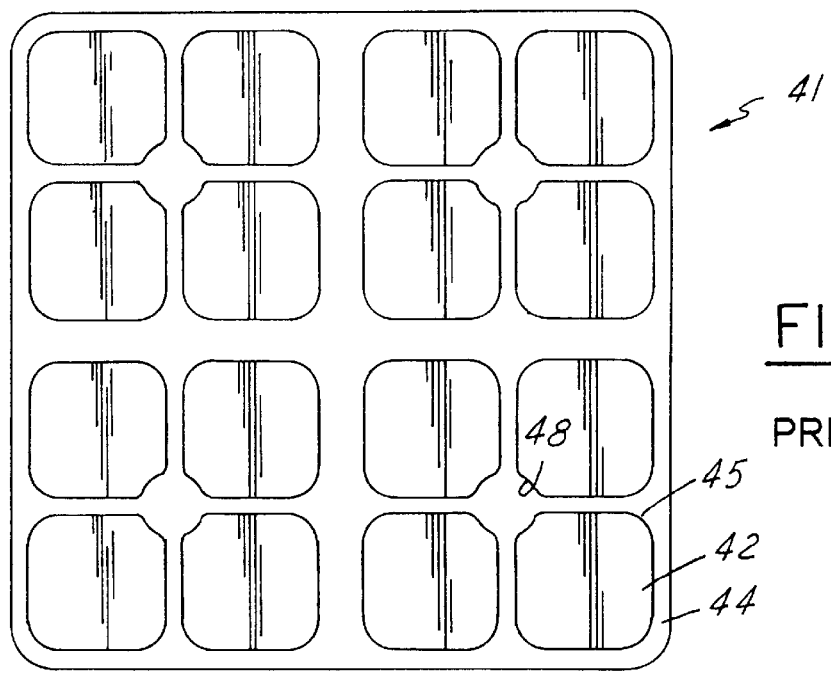
FIG. 7 is a top plan view of a leveler unit having a sixteen-pin design.
Figure 8:
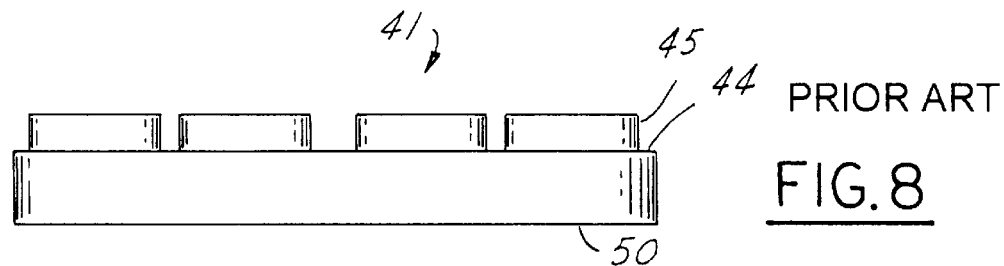
FIG. 8 is a side elevational view of the leveler unit shown in FIG. 7.
Figure 9:
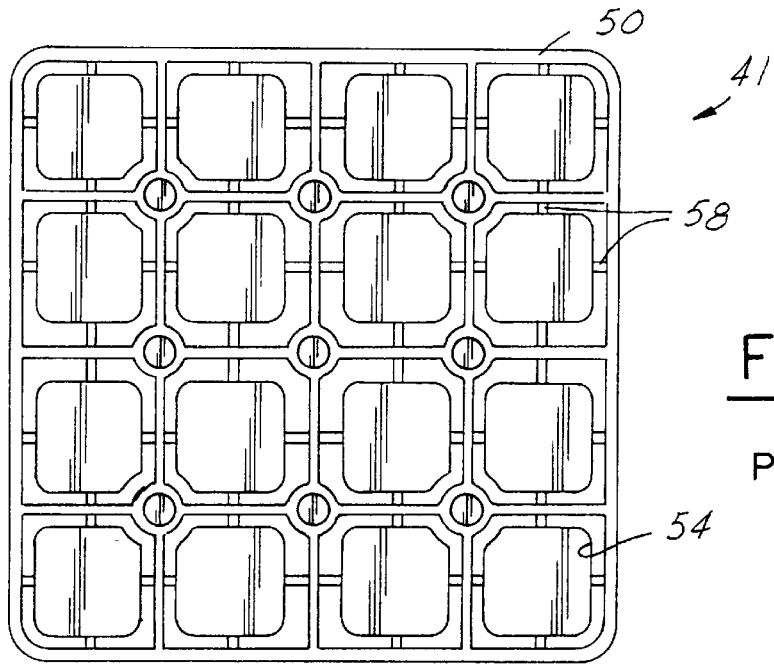
FIG. 9 is a bottom plan view of the leveler unit shown in FIGS. 7 and 8.

Referring to FIGS. 7–9, an alternate unit 41 is provided. The unit 41 has generally square pins 42 that extend from its upper surface 44. The pins have a circumferential surface 45. Along a portion of circumferential surface 45 of the pins which is adjacent to one another, the pins 42 have a quarter circular depression 48 formed therein. The upper surface 44 of the unit 41 provides a continuous barrier similar to the units 2 shown in FIGS. 1–4. The units 41 have a lower surface 50 which abuts the upper surface 44 when the units 41 are stacked upon one another. When stacked upon one another, the units 41 have limited relative lateral movement with respect to one another as previously described for units 2/31, shown in FIGS. 1–6. The 4×4 general design of the unit 41 allows the unit 41 to have sixteen pins. The unit 41 has pockets 54 to receive the pins 42 in a manner as previously described. The pockets 54 have position-limiting ribs 58 adjacent thereto.

Figure 10:
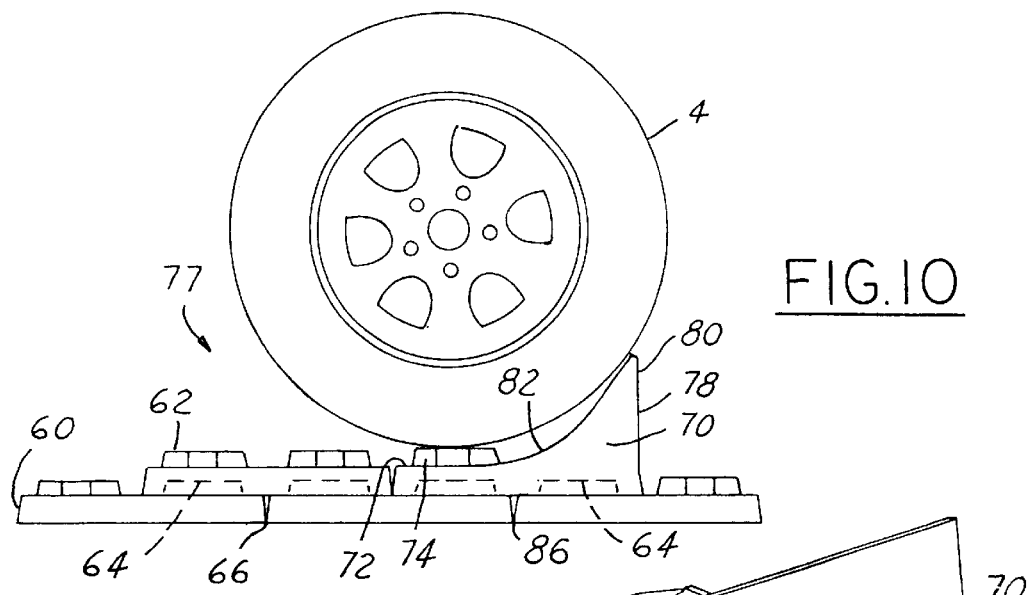
FIG. 10 is a side elevational view of a wheel support leveler assembly according to the present invention.
Figure 11:
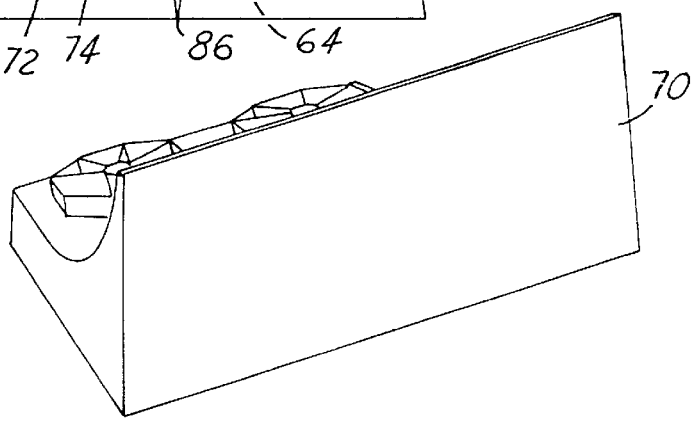
FIG. 11 is a rear perspective view of the positional restraint shown in FIG. 10.

Referring to FIGS. 10–11, a wheel support leveler assembly 77 to lift, support and restrain a position of a vehicle wheel is provided. The assembly 77 has an array of leveler units 60 similar to those described for FIGS. 5 and 6. The leveler units 60 have pins 62. The pins 62 are associated with corresponding pockets 64 that intersect the lower surfaces 66 in a manner as previously described. Positionally stacked on two of the leveler units 60 in an overlapping manner is a vehicle wheel positional restraint 70. The positional restraint 70 has an upper surface 72. The upper surface 72 has projecting therefrom pins 74. At an extreme end 78 the positional restraint has an obstruction 80 on its upper surface. The obstruction 80 as shown is shaped as a ramp having a curvilinear surface 82 having a non-constant increasing radius of curvature thereon going towards its extreme end 78. The positional restraint 70 has a lower surface 86. The lower surface 86 is intercepted by pin receiving pockets similar or identical to pockets 64 for receipt of corresponding pins 62 of the underlying units 60. The positional restraint 70 hinders movement of the wheel towards a first given direction or to the right as shown in FIG. 10. The positional restraint 70 additionally alerts a vehicle operator that the vehicle wheel 4 has reached the desired position on the leveler assembly 77.

Figure 12:
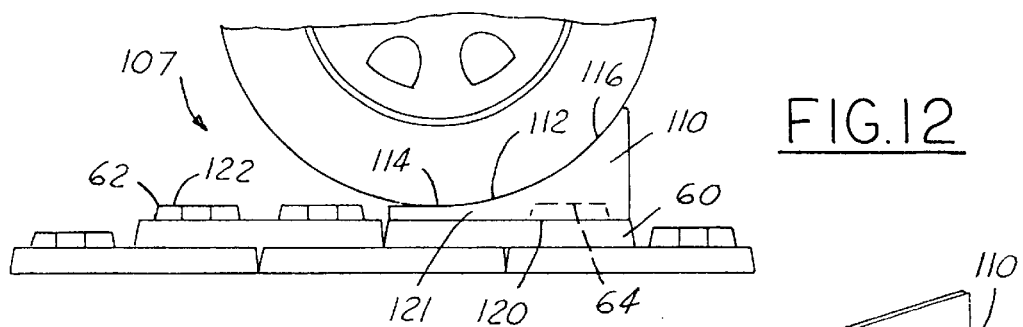
FIG. 12 is a side elevational view of an alternate preferred embodiment wheel support leveler assembly according to the present invention.
Figure 13:
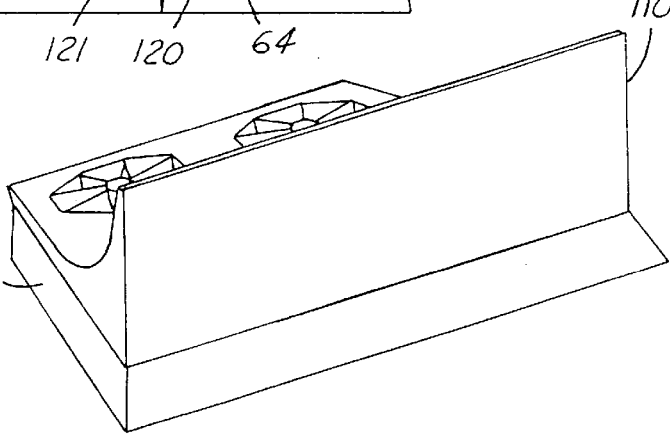
FIG. 13 is a rear perspective view of the wheel support leveler assembly shown in FIG. 12.

Referring to FIGS. 12–13, a wheel support leveler assembly 107 is provided. The assembly 107 has a positional restraint 110. Positional restraint 110 has an upper surface 112 having a generally planar portion 114 which blends into a generally constant radius ramp obstruction portion 116. An under surface 120 of the positional restraint 110 has rear pockets 64 generally as previously described. Additionally, the planar portion 114 has pockets 121 provided by apertures that allow the octagonal pins 62 of the underlying units 60 to extend generally therethrough. An upper surface 122 of the pins is generally at a level adjacent to the top surface of the planar portion 114.

Figure 14:
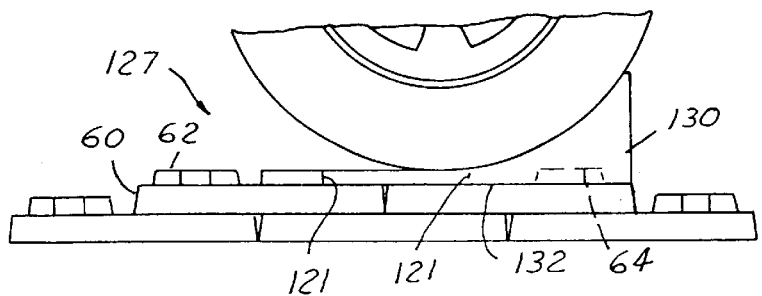
FIG. 14 is a side elevational view of an alternate preferred embodiment wheel support leveler assembly according to the present invention.
Figure 15:
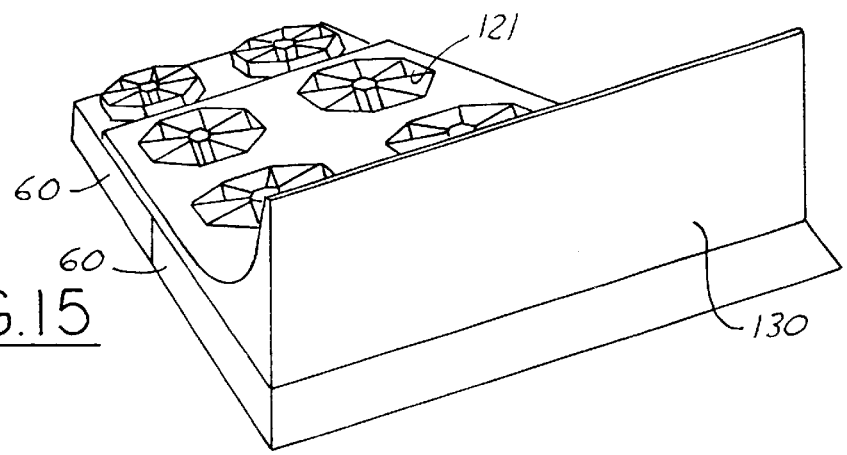
FIG. 15 is a rear perspective view of the wheel support leveler assembly shown in FIG. 14.
Figure 16:
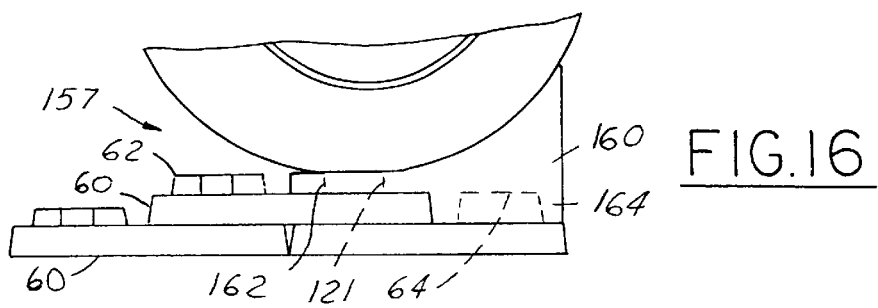
FIG. 16 is a side elevational view of an alternate preferred embodiment wheel support leveler assembly according to the present invention.
Figure 17:
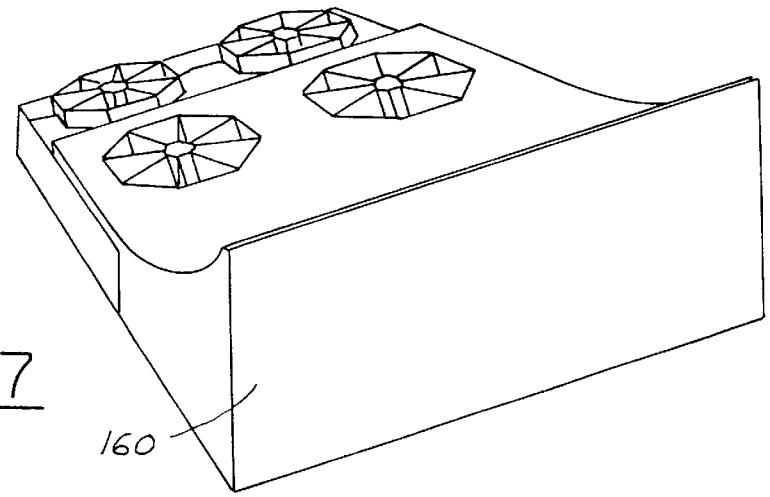
FIG. 17 is a rear perspective view of the wheel support leveler assembly shown in FIG. 16.

Referring to FIGS. 14–15, a wheel support leveler assembly 127 is provided. The assembly 127 is provided with leveler units 60 generally as previously described. Additionally, the assembly 127 has a positional restraint 130. Positional restraint 130 is generally approximately 50% longer than the underlying units 60. The positional restraint 130 has a lower surface 132 which is intersected by a row of pockets 64 and two rows of pockets 121. The positional restraint 130 has interconnection with six of the pins 62 of the underlying two leveler units 60. The positional restraint 130 would typically be more desirable with larger recreational vehicles providing enhanced stability over positional restraints 70 and 110.

Referring to FIGS. 16, 17, 32 and 33, a vehicle support leveler assembly 157 is shown, having a vehicle wheel positional restraint 160. The positional restraint 160 has a planar portion 162. The planar portion 162 has apertures 121 to provide a pocket for underlying pins 62 as previously described. Additionally, the positional restraint 160 has a heel 164 having a bottom or lower surface with a row of pockets 64 as previously described. The positional restraint 164 accordingly not only mates with pin 62 of the top layer of units 60 but also mates with a pin 62 of a bottom layer of units 60. The two mated units 60 are laterally adjacent to one another as well as at different vertical heights. The above noted arrangement typically gives an enhanced stability. In the absence of an underlying layer of units 60, the positional restraint 160 will allow the heel portion to contact the ground or underlying surface.

Referring to FIGS. 18–19, a wheel support leveler assembly 177 is provided having a positional restraint 179. The positional restraint 179 is similar to positional restraint 160 having a heel 181 with corresponding pockets 64. Additionally, positional restraint 179 is approximately 50% greater in length than positional restraint 160 and has a planar portion 183 having two rows of apertures 121 to provide for pockets for underlying pins 64. It has been found that this assembly provides an extreme amount of stability for the positional restraint.

Referring to FIGS. 20–21, a wheel support leveler assembly 207 with a positional restraint 208 is provided. The leveler assembly 207 is similar to that described for assembly 77 with the exception that the leveler units 41, pins 42 and associated pockets 54 are identical or similar to those described in FIGS. 7–9.

Figure 22:
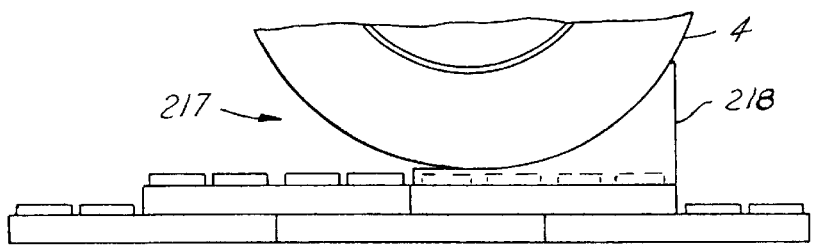
FIG. 22 is a side elevational view of an alternate preferred embodiment wheel support leveler assembly according to the present invention.
Figure 23:
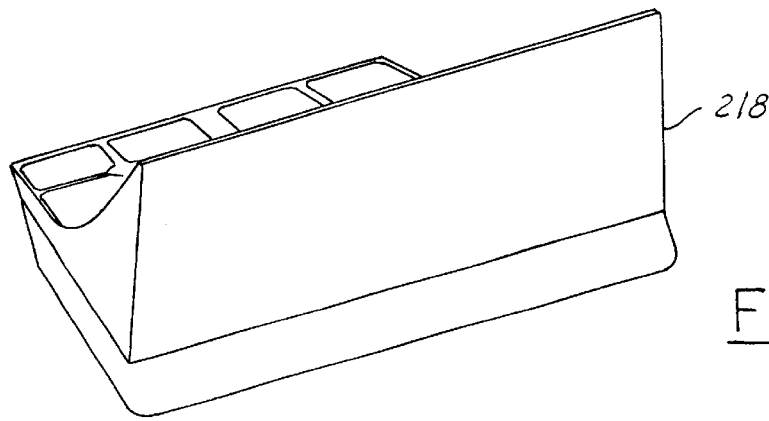
FIG. 23 is a rear perspective view of the wheel support leveler assembly shown in FIG. 22.

Referring to FIGS. 22–23, a wheel support leveler assembly 217 is provided having a positional restraint 218. The function and operation of the assembly 217 is similar to assembly 107 with the exception that leveler units 41, pin 42 and associated pockets 54 are similar to that described in relationship to FIGS. 7–9.

Figure 24:
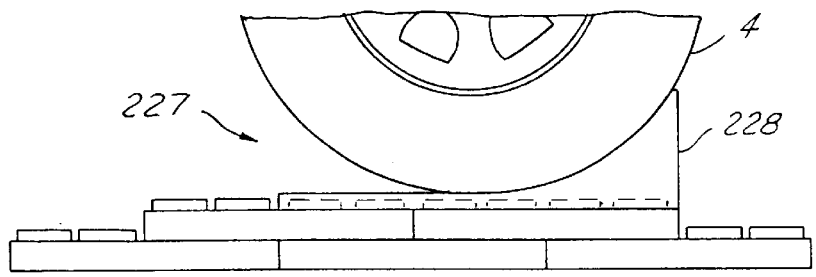
FIG. 24 is a side elevational view of an alternate preferred embodiment wheel support leveler assembly according to the present invention.
Figure 25:
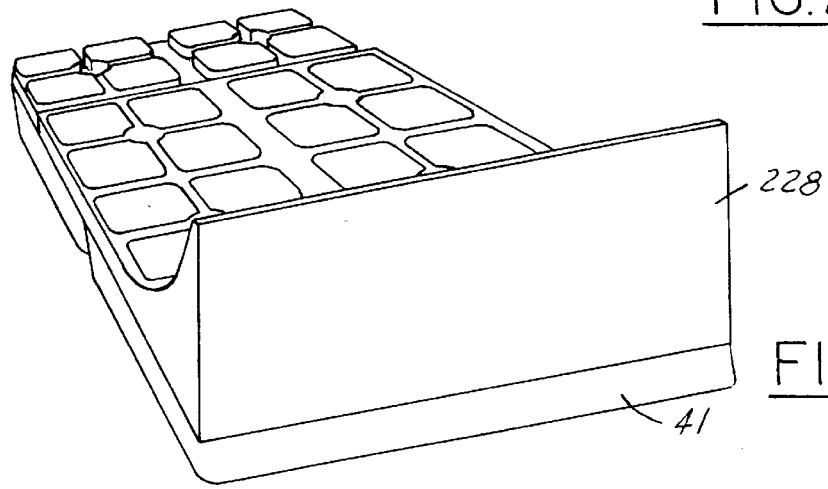
FIG. 25 is a rear perspective view of the wheel support leveler assembly shown in FIG. 24.
Figure 26:
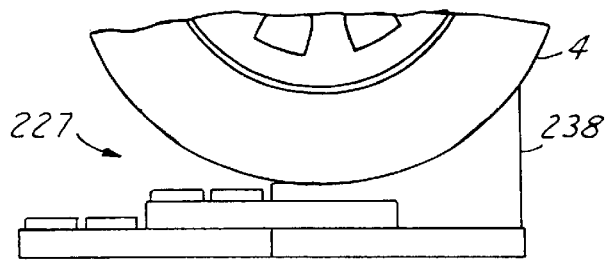
FIG. 26 is a side elevational view of an alternate preferred embodiment wheel support leveler assembly according to the present invention.
Figure 27:
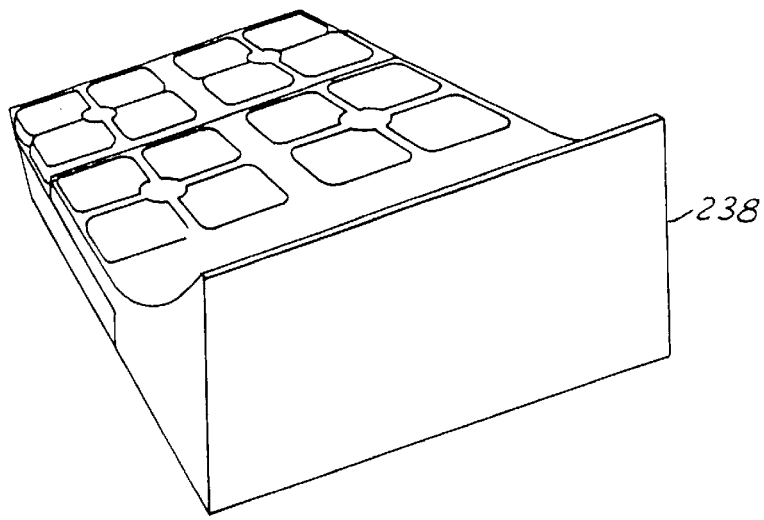
FIG. 27 is a rear perspective view of the wheel support leveler assembly shown in FIG. 26.
Figure 28:
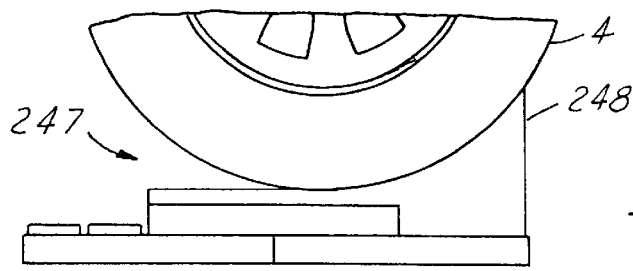
FIG. 28 is a side elevational view of an alternate preferred embodiment wheel support leveler assembly according to the present invention.
Figure 29:
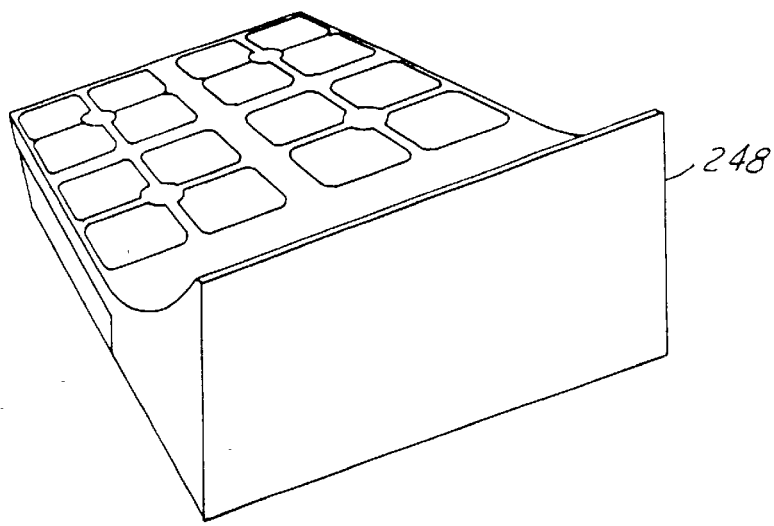
FIG. 29 is a rear perspective view of the wheel support leveler assembly shown in FIG. 28.

FIGS. 24–25 illustrate a wheel support leveler assembly 227 having a vehicle wheel positional restraint 228 similar in form and structure to that aforedescribed in relationship to assembly 127 with the exception that the leveler units 41, pins 42 and associated pockets 54 are similar to that described in relationship to FIGS. 7–9.

FIGS. 26–29 and 34–35 bring forth wheel support leveler assemblies 227 and 247 with positional restraints 238 and 248 which are both similar to aforedescribed assemblies 157 and 177, with the exception that leveler units 41, pins 42 and associated pockets 54 are similar to that described in relationship to FIGS. 7–9.

Figure 30:
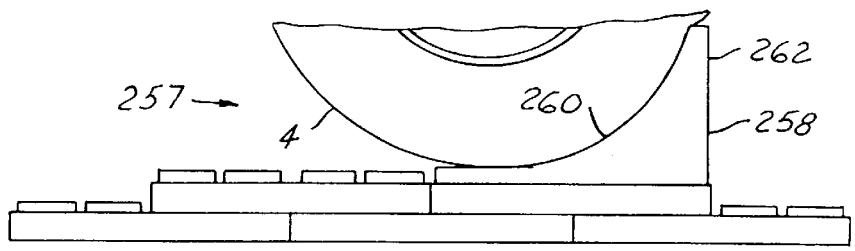
FIG. 30 is a side elevational view of an alternate preferred embodiment wheel support leveler assembly according to the present invention.

Referring to FIG. 30, wheel support leveler assembly 257 is provided. The wheel support leveler assembly 257 has a positional restraint 258 which is substantially similar to the positional restraint 218 mentioned previously in FIGS. 23–24. However, positional restraint 258 has a ramp obstruction surface 260 which has a declining radius of curvature as the ramp surface 260 proceeds towards an extreme end 262 of the positional restraint.

Figure 31:
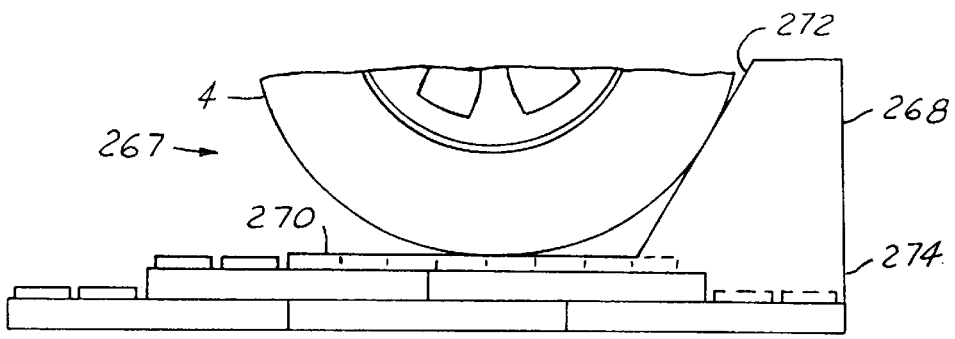
FIG. 31 is a side elevational view of another alternate preferred embodiment wheel support leveler assembly according to the present invention.
Figure 32:
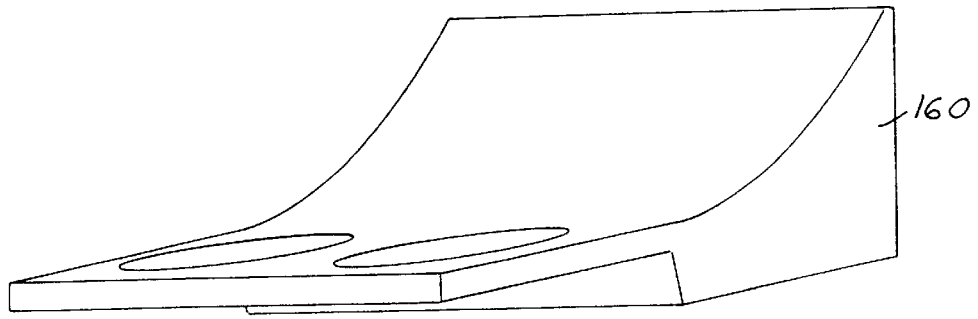
FIGS. 32 and 33 are upper and lower perspective views of the positional restraints shown in FIGS. 16 and 17.
Figure 33:
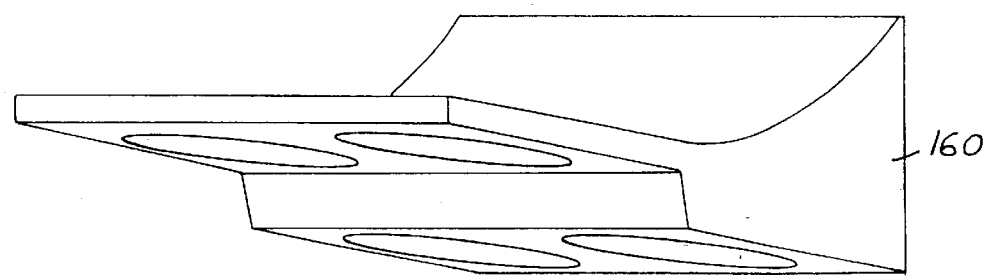
Figure 34:
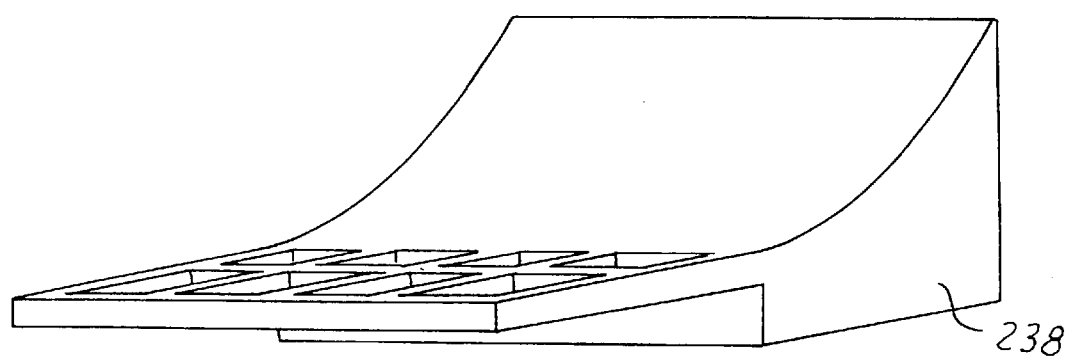
FIGS. 34 and 35 are upper and lower perspective views of the positional restraints shown in FIGS. 26 and 27.
Figure 35:
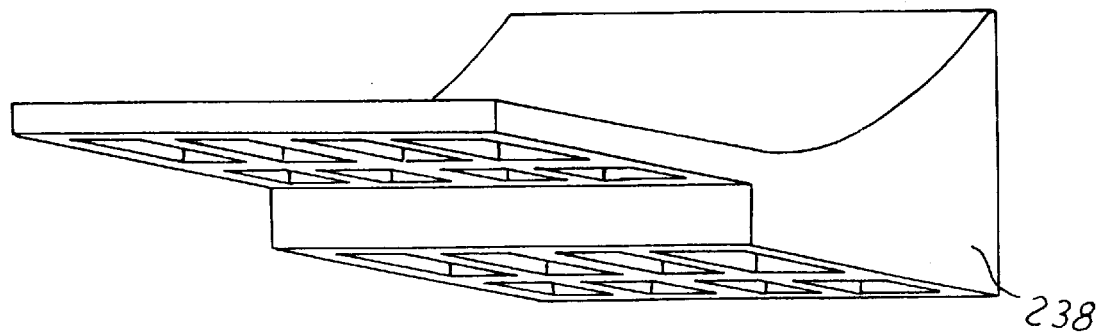

FIG. 31 brings forth a wheel support leveler assembly 267 with a positional restraint 268. The positional restraint 268 has an upper surface with a generally planar portion 270 which intercepts a generally straight line ramp obstruction 272. Additionally, the positional restraint 268 has a heel 274.

Typically the positional restraints will be fabricated from like material utilized for the leveler units.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

We claim:

1. A wheel support leveler assembly for vehicles to lift, support and restrain a position of a wheel of said vehicle in a first direction, said assembly comprising:

a first planar body with upper and lower surfaces circumscribed by edges, pins upwardly extending from spaced locations on said first planar body upper surface, each of said pins having a circumferential surface, and said first planar body having pin-engaging pockets of contours to matably receive corresponding pins of other similar first planar bodies formed in appropriate locations in said lower surface of said first planar body, said pins being slightly smaller than corresponding pockets of other said first planar bodies so as to provide limited lateral movement between said first planar bodies by means of a loose engagement between certain of said pins of one first planar body and certain of said pockets of another first planar body wherein a clearance is provided about the entire circumferential surface of each said pin between said pin and said corresponding pocket, thereby preventing an interference fit at any portion of said circumferential surface of said pin and said corresponding pocket; and a second body circumscribed by edges, said second body having a first lower surface with a pin engaging pocket to receive at least a pin of said first planar body, and said second body having an upper surface with an obstruction to restrain movement of said vehicle wheel in said first direction; wherein said second body is removable from said first planar body.

2. An assembly as described in claim 1, wherein said obstruction is adjacent an extreme end of said second body.

3. An assembly as described in claim 1 wherein said obstruction is a ramp surface.

4. An assembly as described in claim 3 wherein said obstruction ramp surface has a curvilinear shape.

5. An assembly as described in claim 4 wherein said ramp curvilinear shape defines a non-constant radius of curvature.

6. An assembly as described in claim 4 wherein said ramp curvilinear shape defines a declining radius of curvature.

7. An assembly as described in claim 4 wherein said ramp shape defines an increasing radius of curvature.

8. An assembly as described in claim 1 wherein said second body has a generally planar portion which extends over at least a pin of said first body and a ramp obstruction continuously joined thereto.

9. An assembly as described in claim 8 wherein said planar portion has a top surface at a level adjacent to a top surface of a pin of said first planar portion which extends therethrough.

10. An assembly as described in claim 1 wherein said second body additionally has at least a first pin extending from a top surface thereof.

11. An assembly as described in claim 1 wherein said second body has a pocket formed by an aperture continuously formed therethrough.

12. An assembly according to claim 1 wherein said second body has approximately the same length as said first planar body.

13. An assembly as described in claim 1 wherein said second body has a length approximately 50% greater than the length of said first planar body.

14. An assembly according to claim 1 wherein said pins of said first body are of similar shape and size.

15. An assembly according to claim 1 wherein said pockets of said first planar body are disposed directly beneath corresponding pins and extend into said pins.

16. An assembly according to claim 1 wherein said pins and pockets of said first planar body are arranged so that if a pair of first planar bodies are horizontally aligned adjacent to each other, said pins of adjacent, horizontally-aligned first planar bodies will engage in corresponding pockets of a second body resting thereon.

17. An assembly according to claim 1 wherein said upper and lower surfaces of said first planar body are of square configuration.

18. An assembly according to claim 1 wherein said pins and pockets of said first planar body are aligned in rows parallel to the edges of the unit, each pin being located from its adjacent pins at a distance twice that between that pin and its adjacent edges.

19. An assembly according to claim 1 wherein said pins are of truncated conical shape.

20. An assembly according to claim 1 wherein said pins are of a polygonal shape.

21. An assembly according to claim 1 wherein said planar first body has sixteen generally square pins.

22. An assembly according to claim 20 wherein said pins along a circumferential surface thereof adjacent to adjoining pins have a quarter-circular depression formed thereon.

23. An assembly according to claim 1 wherein said pins of said first planar body and said upper surface of said first body form a continuous barrier.

24. A vehicle wheel positional restraint used in a wheel support leveler assembly, the assembly including a first planar body of upper and lower surfaces with pins extending from spaced locations on said first planar body upper surface; said positioned restraint comprising:

a positional restraint body circumscribed by edges, said restraint body having a lower surface with pin engaging pockets to receive pins of a first planar body, in an non-interfering manner wherein said second body is removable from said first planar body; and an obstruction on an upper surface of said restraint body, said obstruction to prevent movement of said vehicle in a first given direction.

25. A vehicle wheel positional restraint as described in claim 24 wherein said obstruction is shaped as a ramp.

26. A vehicle wheel positional restraint as described in claim 25 wherein said ramp has a curvilinear shape.

27. A vehicle wheel positional restraint as described in claim 26 wherein said ramp curvilinear shape has a non-constant radius of curvature.

28. A vehicle wheel positional restraint as described in claim 1 wherein said heel has pin receiving pockets formed therein.

29. A vehicle wheel positional restraint as described in claim 24 having a top surface with a generally planar portion for extending over a first planar body and additionally having a ramp obstruction continuously joined to said planar portion.

30. A vehicle wheel positional restraint as described in claim 24 having pockets for receiving an octagonal pin of a first planar body.

31. A vehicle wheel positional restraint as described in claim 24 wherein said positional restraint has pockets for receiving generally square pins of a first planar body.

32. A method of supporting, leveling, and restraining a position of a vehicle wheel in a first direction comprising:
placing on a surface a first planar body with upper and lower surfaces circumscribed by edges, pins upwardly extending from spaced locations on said first planar body upper surface, each of said pins having a circumferential surface, and said first planar body having pin engaging pockets to receive corresponding pins of other similar first planar bodies formed in appropriate locations in said lower surfaces of said first planar body, said pins being slightly smaller than corresponding pockets of other said first planar bodies so as to provide linear lateral movement between said first planar bodies by means of a loose engagement between certain of said pins of one first planar body and certain of said pockets of another first planar body wherein a clearance is provided about the entire circumferential surface of each said pin between said pin and said corresponding pocket, thereby preventing an interference of any portion of said circumferential surface of said pin and said corresponding pocket; and
mating said pin of said first planar body into a corresponding pocket of a vehicle wheel positional restraint, said vehicle wheel positional restraint having a first lower surface with a pin engaging pocket to receive a pin of said first planar body in a non-interfering manner; wherein said second body is removable from said first planar body, said vehicle wheel positional restraint having an obstruction on an upper surface to prevent movement of said vehicle in a first given direction; and
positioning said vehicle wheel to a position wherein said vehicle wheel is adjacent to said obstruction.

33. A method as described in claim 32 further comprising placing a vehicle wheel positional restraint with at least two pockets on pins of two underlying first planar bodies.

34. A wheel support leveler assembly for vehicles to lift, support and restrain a position of a wheel of said vehicle in a first direction, said assembly comprising:
a first planar body with upper and lower surfaces circumscribed by edges, pins upwardly extending from spaced locations on said first planar body upper surface, each of said pins having a circumferential surface, and said first planar body having pin-engaging pockets of contours to matably receive corresponding pins of other similar first planar bodies formed in appropriate locations in said lower surface of said first planar body, said pins being slightly smaller than corresponding pockets of other said first planar bodies so as to provide limited lateral movement between said first planar bodies by means of a loose engagement between certain of said pins of one first planar body and certain of said pockets of another first planar body wherein a clearance is provided about the entire circumferential surface of each said pin between said pin and said corresponding pocket, thereby preventing an interference fit at any portion of said circumferential surface of said pin and said corresponding pocket; and
a second body circumscribed by edges, said second body having a first lower surface with a pin engaging pocket to receive at least a pin of said first planar body, and said second body having an upper surface with an obstruction to restrain movement of said vehicle wheel in said first direction and said second body having a heel portion lateral of said first body.

35. An assembly as described in claim 34 wherein said obstruction is adjacent an extreme end of said second body.

36. An assembly as described in claim 34 wherein said obstruction is a ramp surface.

37. An assembly as described in claim 36 wherein said obstruction ramp surface has a curvilinear shape.

38. An assembly as described in claim 34 wherein said second body heel portion has pin engaging pockets on a lower surface.

39. An assembly as described in claim 34 wherein said second body has a generally planar portion which extends over at least a pin of said first body and a ramp obstruction continuously joined thereto.

40. An assembly as described in claim 34 wherein said second body has a length approximately 50% greater than the length of said first planar body.

41. An assembly as described in claim 34 wherein said upper and lower surfaces of said first planar body are of square configuration.

42. An assembly as described in claim 34 wherein said pins are of truncated conical shape.

43. An assembly as described in claim 34 wherein said pins are of a polygonal shape.

44. An assembly as described in claim 34 wherein said planar first body has sixteen generally square pins.

45. A vehicle wheel positional restraint used in a wheel support leveler assembly, the assembly including a first planar body of upper and lower surfaces with pins extending from spaced locations on said first planar body upper surface; said positioned restraint comprising:
a positional restraint body circumscribed by edges, said restraint body having a first lower surface with pin engaging pockets to receive pins of a first planar body, in an a non-interfering manner, and said restraint body having a heel portion for positioning lateral of said first planar body; and
an obstruction on an upper surface of said restraint body, said obstruction to prevent movement of said vehicle in a first given direction.

46. A vehicle wheel positional restraint as described in claim 45 wherein said obstruction is shaped as a ramp.

47. A vehicle wheel positional restraint as described in claim 46 wherein said ramp has a curvilinear shape.

48. A vehicle wheel positional restraint as described in claim 45 wherein said heel has pin receiving pockets formed therein.

49. A vehicle wheel positional restraint as described in claim 45 having a top surface with a generally planar portion for extending over a first planar body and additionally having a ramp obstruction continuously joined to said planar portion.

50. A vehicle wheel positional restraint as described in claim 45 having pockets for receiving an octagonal pin of a first planar body.

51. A vehicle wheel positional restraint as described in claim 45 wherein said positional restraint has pockets for receiving generally square pins of a first planar body.

52. A method of supporting, leveling, and restraining a position of a vehicle wheel in a first direction comprising:
placing on a surface a first planar body with upper and lower surfaces circumscribed by edges, pins upwardly extending from spaced locations on said first planar body upper surface, each of said pins having a circumferential surface, and said first planar body having pin engaging pockets to receive corresponding pins of other similar first planar bodies formed in appropriate locations in said lower surfaces of said first planar body, said pins being slightly smaller than corresponding pockets of other said first planar bodies so as to provide linear lateral movement between said first planar bodies by means of a loose engagement between certain of said pins of one first planar body and certain of said pockets of another first planar body wherein a clearance is provided about the entire circumferential surface of each said pin between said pin and said corresponding pocket, thereby preventing an interference of any portion of said circumferential surface of said pin and said corresponding pocket; and mating said pin of said first planar body into a corresponding pocket of a vehicle wheel positional restraint, said vehicle wheel positional restraint having a first lower surface with a pin engaging pocket to receive a pin of said first planar body in a non-interfering manner, said vehicle wheel positional restraint having a heel portion for positioning lateral of said planar body, said heel portion having a second lower surface lower than said first lower surface, said vehicle wheel positional restraint having an obstruction on an upper surface to prevent movement of said vehicle in a first given direction; and positioning said vehicle wheel to a position wherein said vehicle wheel is adjacent to said obstruction.

53. A method as described in claim 52 further comprising placing a vehicle wheel positional restraint with said heel portion having a pin receiving pocket for a pin of a second planar body underlying said heel.

\* \* \* \* \*

Disclaimer 6,752,381 B2 — John I. Colak, Calgary, Canada; L. Reg Funk, Calgary, Canada. WHEEL POSITIONAL RESTRAINT DEVICE AND METHOD FOR USING THE SAME. Patented June 22, 2004. Disclaimer filed July 26, 2004, by the assignee, Tri-Lynx Corporation.

Hereby enters this disclaimer to claim 28 of said patent.

*(Official Gazette, September 21, 2004)*